US006968356B1

(12) United States Patent
Lakhdir

(10) Patent No.: US 6,968,356 B1
(45) Date of Patent: Nov. 22, 2005

(54) METHOD AND APPARATUS FOR TRANSFERRING DATA BETWEEN A CLIENT AND A HOST ACROSS A FIREWALL

(75) Inventor: Mansoor Abdulali Lakhdir, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 09/692,394

(22) Filed: Oct. 19, 2000

(51) Int. Cl.[7] .............................................. G06F 15/16
(52) U.S. Cl. ......................... 709/203; 703/23; 703/25; 709/231
(58) Field of Search ............................. 709/203, 201, 709/217, 222, 227, 200; 710/306, 201; 370/241; 703/25, 23

(56) References Cited

U.S. PATENT DOCUMENTS

| | | | | |
|---|---|---|---|---|
| 5,732,219 A | * | 3/1998 | Blumer et al. | 709/227 |
| 5,742,769 A | * | 4/1998 | Lee et al. | 709/206 |
| 5,793,966 A | * | 8/1998 | Amstein et al. | 709/203 |
| 5,935,249 A | * | 8/1999 | Stern et al. | 713/201 |
| 5,946,487 A | | 8/1999 | Dangelo | 395/705 |
| 5,973,696 A | * | 10/1999 | Agranat et al. | 345/760 |
| 5,974,441 A | * | 10/1999 | Rogers et al. | 709/200 |
| 6,041,041 A | * | 3/2000 | Ramanathan et al. | 370/241 |
| 6,041,380 A | * | 3/2000 | LaBerge | 710/306 |
| 6,169,992 B1 | * | 1/2001 | Beall et al. | 707/103 R |
| 6,601,020 B1 | * | 7/2003 | Myers | 702/186 |
| 6,684,257 B1 | * | 1/2004 | Camut et al. | 709/246 |

OTHER PUBLICATIONS

IBM Research Disclosure 410116, *Internet Based Secure Transactions using Encrypting Applets and CGI-Scripts Independent of Browser or Server Capabilities*, Jun. 1998, pp. 800-801.
IBM Research Disclosure 408149, *Web Transport Gateway*, Apr. 1998, pp. 464-465.
IBM Research Disclosure 412102, *System for Service Level Identification in a Client/Server WWW/Java Environment*, Aug. 1998, pp. 1149-1150.
IBM Research Disclosure 429128, *Servlet/Applet/HTML Authentication Process with Single Sign-On*, Jan. 2000, pp. 162-164.

* cited by examiner

*Primary Examiner*—Hosain Alam
*Assistant Examiner*—Ben Bruckart
(74) *Attorney, Agent, or Firm*—Duke W. Yee; Jeffrey S. LaBaw; Francis Lammes

(57) ABSTRACT

A method in a data processing system for a program to communicate across a firewall with a host. A browser is simulated by the program in the data processing system, wherein the browser being simulated is able to communicate through the firewall. The program communicates with the host directly using the simulation instead of using the browser.

22 Claims, 11 Drawing Sheets

```
/*
 * This is a function that is executed by the applet. This Java code
 *     allows the applet to make a connection and then
 *     talk (exchange data) with the host that it was downloaded from.
 *
 * So, create a URL Connection to the server that you (applet) were
 *     launched from and then exchange data with the server.
 *
 * Inputs to this function are:
 * 1. aFileAtURL - This is the name of a servlet or CGI program at
 *     the server. The applet uses a servlet or CGI
 *     helper program back at the host to handle Add,
 *     Delete, Update and Retrieve of data from a
 *     backend database.
 *
 * 2. dataString - This is the data stream that will be sent to the
 *     host once a successful connection is created.
 *
 */
public void stdioTalkToHome (String aFileAtURL, String dataString )
{
    // The following 3 vars will be defined before the static }}
    //    block in the applet
    URL redirectURL = null;
    static final int DEFAULT_PORT = 80;
    String msgOutString    = "";

URLConnection urlc = null;
    String host;
    int port;
    BufferedReader bri = null;
    DataOutputStream dos = null;
```

```
// if a msg to the user is already showing, re-surface that msg.
if (getMsgHandle() != null)
{
    getMsgHandle() .changeText("Connecting to host... Please Wait.") ;
    getMsgHandle() .showIt() ;
}
else
{
    ivMsg = new PopUpMsg( "Applet Status",
                         "Connecting to host... Please Wait.") ;
}                                                                          } 702

// find the host & port that I (applet) was launched from...
host = getDocumentBase() .getHost() ;
port = getDocumentBase() .getPort() ;

consoleDebug("host = " + host) ;
consoleDebug("port = " + port) ;

// if port is not set...
if (-1 == port)
{
    // force it to default port...                                         } 704
```

FIG. 7B

```
// Create the fully qualified URL string...
try
{
    redirectURL = new URL( getDocumentBase().getProtocol(),
                           host,
                           port,
                           aFileAtURL );
}
catch (MalformedURLException e)
{
    showHostCommError(1000, "Host URL could not be located for network communication.");
    showError(e);
    return;
}
consoleDebug("Home URL=" + redirectURL);
```
⎫
⎬ 706
⎭

```
// Now, create the URLconnection to the host...
try
{
    urlc = redirectURL.openConnection();

// next, change the setup parameters...
    urlc.setDoInput(true);
    urlc.setDoOutput(true);
    urlc.setUseCaches(false);
    urlc.setAllowUserInteraction(false);

// and also the request property...
    urlc.setRequestProperty( "Content-Type", "application/x-www-form-urlencoded" );
```
⎫
⎬ 708
⎭

```
catch (IOException e)
{
    showHostCommError(1001, "A URLConnection for host communication could not be created.");
    showError(e);
    return;
}
consoleDebug("Home URLConnection was created");

if (getMsgHandle() != null)
{
    getMsgHandle().changeText("Sending data to host... Please Wait.");
    getMsgHandle().showIt();
}
```
⎫
⎬ 708
⎭

```
// Send the data from applet to the host server
try
{
    dos = new DataOutputStream(urlc.getOutputStream());
    dos.writeBytes(dataString);
    dos.close();
    consoleDebug("line written: " + dataString);
}
catch (IOException e)
{
    showHostCommError(1005, "User Data write failure occurred during host communication.");
    showError(e);
    return;
}
consoleDebug("All data was sent to host.");
```
⎫
⎬ 710
⎭

```
// Create a Reader
if ( urlc != null )
{
    try
    {
        bri = new BufferedReader(new InputStreamReader(urlc.getInputStream()));
    }
    catch (UnknownServiceException e)
    {
        showHostCommError(1003, "A reading stream for host communication could not be created due to UnKnownServiceException.");
        showError(e);
        return;
    }
    catch (IOException e)
    {
        showHostCommError(1003, "A reading stream for host communication could not be created due to IOException.");
        showError(e);
        return;
    }
    consoleDebug("reader created");
    if (getMsgHandle() != null)
    {
        getMsgHandle().changeText("Receiving data from host... Please Wait.");
        getMsgHandle().showIt();
    }
    // Receive data from host server (using Reader).
    String msgOutLineString;
```

FIG. 7E

```
if ( bri != null )
{
    try
    {
        while ( (msgOutLineString = bri.readLine()) != null)
        {
            consoleDebug("msgOutLineString :" + msgOutLineString);

msgOutString += msgOutLineString + "\n";
        }
    }
    catch (IOException e)
    {
        showHostCommError(1007, "Failure receiving data from host.");
        showError(e);
        return;
    }
} consoleDebug("msgOutString :" + msgOutString);

consoleDebug("Through reading data from server");

if (getMsgHandle() != null)
{
    getMsgHandle().changeText("Closing host connection... Please Wait.");
    getMsgHandle().showIt();
}
```

FIG. 7F

```
// Cleanup
if ( bri != null )
~
    try
    ~
        bri.close();
    ~
    catch (IOException e)
    ~
        showHostCommError(1008, "Input stream close error during host communication.");
        showError(e);
        return;
    ~
~

// Check for and show the user any host communication ERRORS...
. . .

// Bring down any communication STATUS msgbox that we were
//   showing the user....
. . .

~ /* end of stdio TalkToHome */
```

FIG. 7G

```
/**
 * This function shows debug info in Java Console of the
 * browser only if TRACE flag has been turned on.
 *
 * Inputs to this function are:
 *
 * 1. show - This is the string to display in the Java Console
 *
 */
public static void consoleDebug(String show)
{
    if (TRACE)
    {
        System.out.println("=>" + show);
    }
} /* end of consoleDebug */
```

METHOD AND APPARATUS FOR TRANSFERRING DATA BETWEEN A CLIENT AND A HOST ACROSS A FIREWALL

BACKGROUND OF THE INVENTION

1. Technical Field

The present invention relates generally to an improved data processing system, and in particular to a method and apparatus for transferring data between a host and a client. Still more particularly, the present invention provides a method and apparatus for transferring data between a host and a client across a firewall.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

The Java run-time environment is specifically designed to limit the harm that a Java application can cause to the system that it is running on. This is especially important with the World Wide Web, where Java applets are downloaded and executed automatically when a user visits a Web page that contains Java pplets. Normally one would not want to execute random programs; they might contain viruses, or they might even be potentially malicious themselves and not merely carrying unwelcome code unintentionally. An unsigned Java applet cannot write, print, copy to clipboard, and in general cannot access the local resources of the client system. The Security Manager class implementation in all Java (JVM) enabled browsers imposes this restriction. An end-user cannot do anything to get around this restriction. The author of the Java applet may choose to attach a digital certificate from a third trusted party (e.g., VeriSign) to the applet class/jar/cab files and thus create a signed applet on the server. Then, a end-user may choose to accept the signed applet, which can then access local resources such as printers, hard-disks, clipboards, etc. These applets are also referred to as unsigned or untrusted applets.

An unsigned applet can only communicate with the host from which the applet was launched. The security manager in a browser does not allow an unsigned applet to establish a connection with any other host. This security mechanism becomes a problem in view of the fact that many clients are behind firewalls. In this situation, the Java applet attempts to make a socket connection to the originating host and the connection fails because the intervening firewall server prevents the connection. This situation occurs because the applet is servered to the client by the intervening socks server. The client browser assumes, incorrectly, that the socks server is the hosting server of the applet. So, the browser does not allow a socket connection to the true hosting server of the applet.

One mechanism available for allowing an applet on a client to communicate with a host through a firewall is the use of SOCK-et-S (SOCKS), which is a generic proxy protocol for TCP/IP based networking applications. Using this protocol, an applet is able to communicate with a host across a firewall. This mechanism requires two components. The firewall must have a SOCKS server implemented at the application layer in an Open System Interconnect (OSI) stack. On the client, a SOCKS client is implemented between the application layer and the transport layer. With SOCKS, clients on one side of a SOCKS server are able to gain full access to hosts on the other side of the SOCKS server without requiring direct IP reachability. This mechanism, called "socksfying" the client, however, requires installation and configuration of additional software on each client. Such a modification is not always feasible, especially when gathering information from a large number of different clients on different networks.

Therefore, it would be advantageous to have an improved method and apparatus for facilitating communication between an applet and a host across a firewall, especially for unsigned applets.

SUMMARY OF THE INVENTION

The present invention provides a method in a data processing system for a program to communicate across a firewall with a host. A browser is simulated by the program in the data processing system, wherein the browser being simulated is able to communicate through the firewall. The program communicates with the host directly using the browser simulation instead of using socket connections.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7H are diagrams illustrating code segments in an applet for simulating a browser in accordance with a preferred embodiment of the present invention.

DETAILED DESCRIPTION OF THE PREFERRED EMBODIMENT

Figure 1:
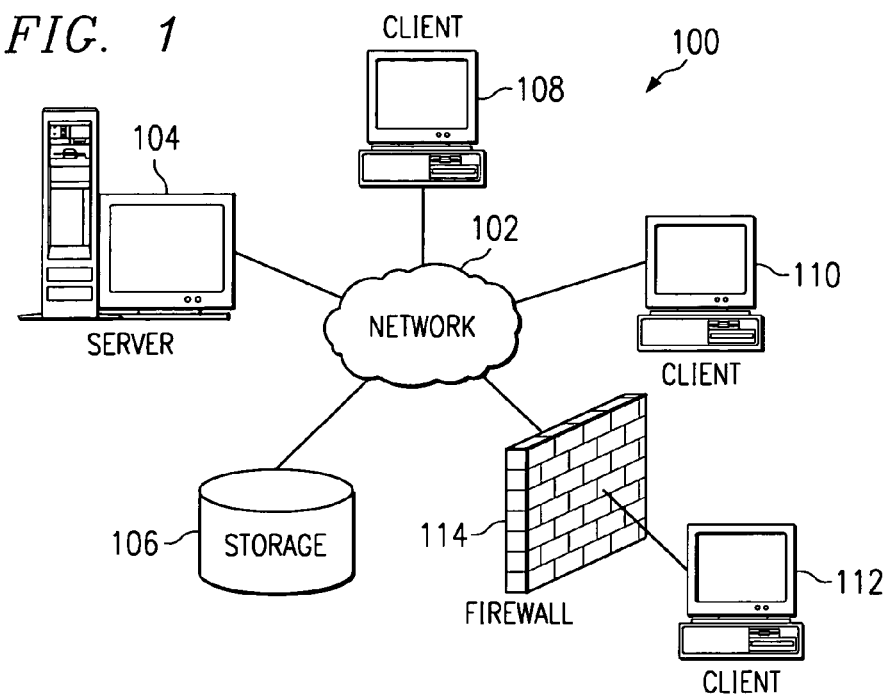
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 is a host, providing data, such as boot files, operating system images, and applications to clients 108–112. Clients 108, 110, and 112 are clients to server 104. In this example, client 112 is located behind firewall 114, which provides security for data located within client 112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
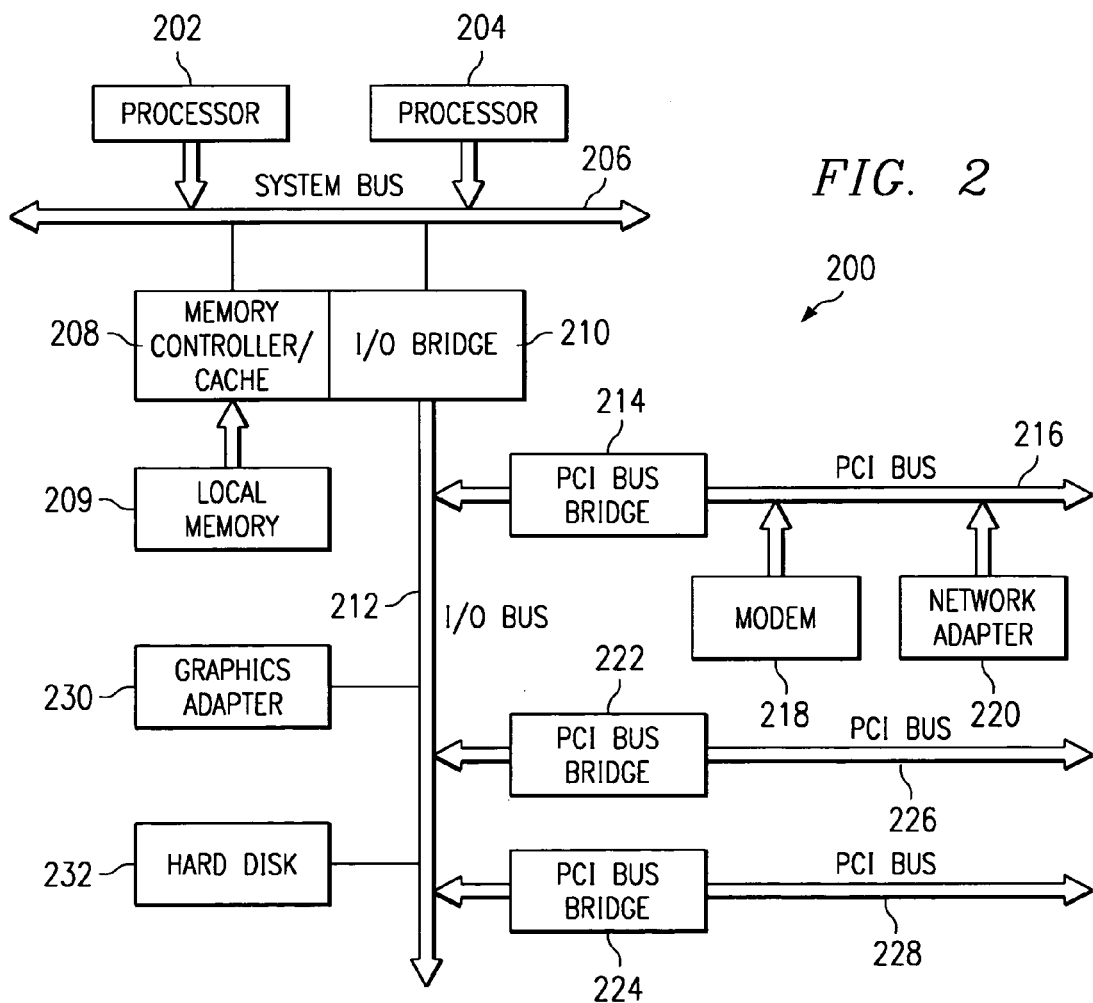
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
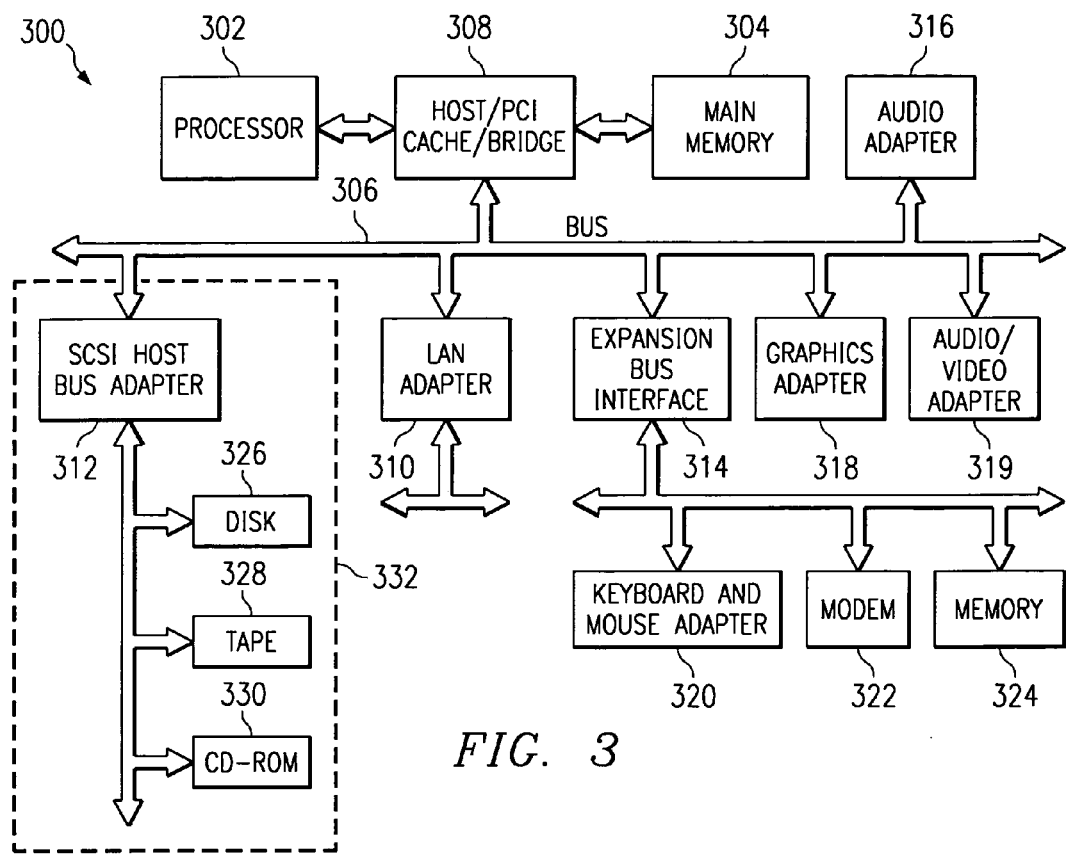
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer implemented instructions for communications between a client and host across a firewall. In particular, the mechanism of the present invention may be used with an unsigned applet on a client to allow the applet to send and receive data to and from a host across a firewall. For communicating with the host that originated the applet, the applet simulates a browser in its communications with the host. Normally, the applet communicates with a server through a socket. This type of communication, using a socket does not work because the applet will try to run a program on the firewall server, believing that the firewall server is the hosting server, when no such program is present.

Specifically, the applet prepares a HTTP encoded stream similar to one that is sent by a browser. To provide this capability to the applet, the code making up the applet is designed to use HTTP and URL connection processes as described in more detail below in FIGS. 7A–7D. In creating the HTTP encoded stream, the applet will include a URL to the program at the host as well as identifying the data that will be passed to that program. Since the browser is able to communicate through a firewall, this encoded data stream from the unsigned applet also is able to pass through the firewall. In the depicted examples, the HTTP encoded stream is a universal resource locator (URL) encoded stream. On the originating host, a program receives and processes the stream from the applet.

This program on the host may be, for example, a common gateway interface (CGI) script or a servlet. A CGI script is a small program written in a language such as Perl, Tcl, C and C++ that functions as the glue between HTML pages and other programs on the Web server. For example, a CGI script allows search data entered on a Web page to be sent to the database management system (DBMS) for lookup. The CGI script also formats the results of that search as an HTML page and sends it back to the user. The CGI script resides in the server and obtains the data from the user via environment variables that the Web server makes available to it. A servlet is a Java application that runs in a Web server or application server and provides server-side processing, typically to access a database or perform e-commerce processing.

Figure 4:
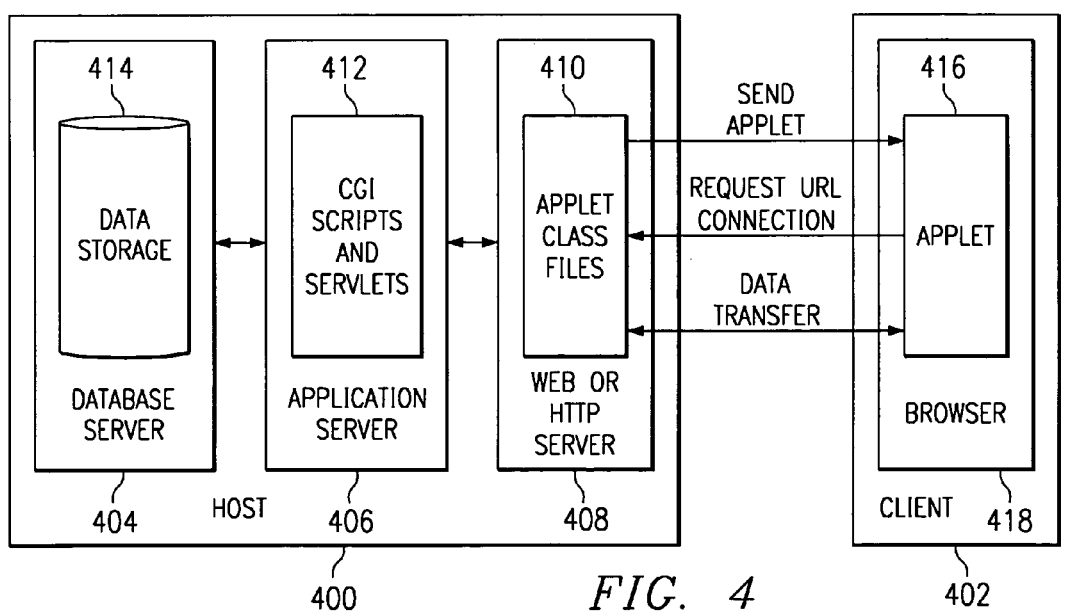
FIG. 4 is a diagram illustrating components and data flow used to provide communication between a client and a host across a firewall in accordance with a preferred embodiment of the present invention.

With reference now to FIG. 4, a diagram illustrating components and data flow used to provide communication between a client and a host across a firewall is depicted in accordance with a preferred embodiment of the present invention. In this example, communications is provided between host 400 and client 402 across a firewall, which is not shown. Host 400 may be implemented as server 104 in FIG. 1 while client 402 may be implemented as client 112 in FIG. 1. In this example, host 400 includes a database server 404, an application server 406, and a web server 408. Web server 408 also is referred to as an HTTP server. Web server 408 handles all the HTTP requests coming into a website. Then, web server 408 hands off the request to the application server 406, which then talks to the database server 404 if necessary to access data or write data. Also, all responses from the website go out, to the client, through web server 408.

Web server 408 also includes a directory that contains the Java class files and the graphics files such as .gifs, .jpegs, etc. In this example, web server 408 includes applet class files 410. Application server 406 runs the CGI scripts. This server has a servlet engine to run servlets. In this example, application server 406 contains CGI scripts and servlets 412. Database server 404 is used to store and access data, such as in data storage 414. These 3 servers (daemon processes) can all run on one machine or each server can run on its own separate dedicated box.

In this example, applet 416 is executing within browser 418 on client 402. Applet 416 was downloaded from applet class files 410 in response to a user input to browser 418. Applet 416 performs a data transfer with host 400 in response to various user inputs. For example, applet 416 may provide a form to retrieve data about client 402, such as operating system type, processor type, amount of memory, adapter types, and storage capacity. Also, applet 416 may receive data for display to a user on client 402.

To avoid connection problems with a firewall, applet 416 uses HTTP to create and open a URL connection to a CGI program or servlet on host 400. In this example, the communication is to a CGI script or a servlet 412. When invoking the CGI script or a servlet 412, some parameters may be passed to these programs through the use of a "Path info" and/or "Query string". These parameters may be optionally included in the URL used to establish the connection. The value of these parameters may be used to cause the CGI script or a servlet 412 to execute a selected operation on the data. The "Path info" or "Query string" is part of the URL string, and as such is sent to the host, or more appropriately to the CGI script or servlet at the host, as part of the creation of the URL connection.

All of the data from the applet may be passed to the CGI script or a servlet 412 in an output stream, simulating a POST method used by a browser. A POST method is used to send data in an HTML FORM, in a client browser, to the server. Next, the CGI script or a servlet 412 may process the data and store the data in data storage 414 or retrieve other data from data storage 414. Return data may be returned to the applet 416 by the CGI script or a servlet 412 in an input stream of the applet 416. In this manner, a user is not required to modify the TCP/IP stack on client 402 or make other modifications to communicate with host 400.

Figure 5:
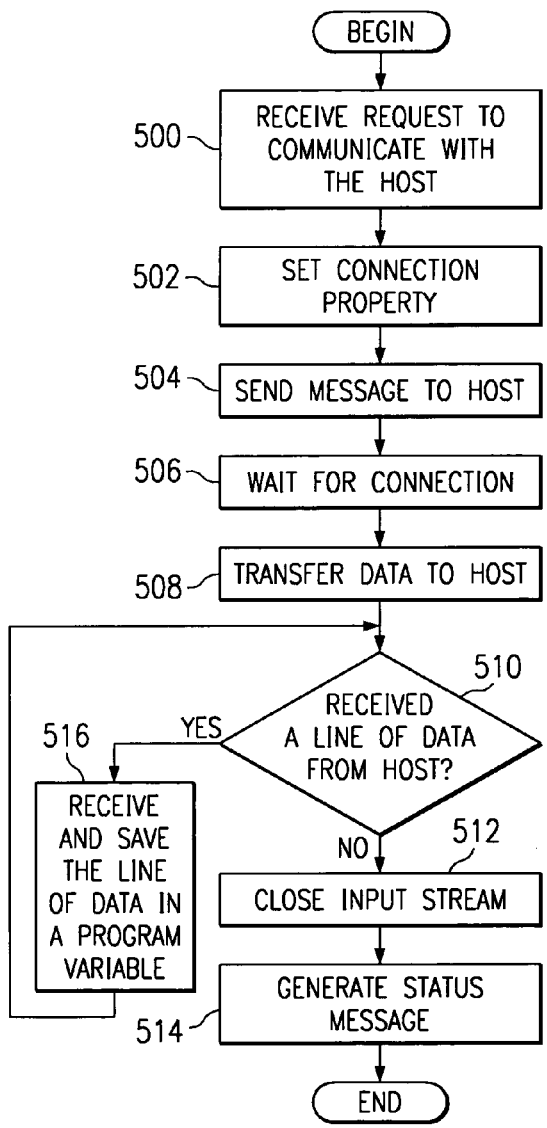
FIG. 5 is a flowchart of a process used to transfer data in an applet in accordance with a preferred embodiment of the present invention.

Turning next to FIG. 5, a flowchart of a process used to transfer data in an applet is depicted in accordance with a preferred embodiment of the present invention. In FIG. 5, the illustrated processes may be implemented in an applet, such as applet 404 in FIG. 4.

The process begins by receiving a request to communicate with the host (step 500). This host is the host originating the applet. The request is typically initiated by a user input requesting an action requiring the applet to communicate with the host in which data is exchanged. Next, a connection property is set in an message to be sent to the host (step 502). This message is one that is used to simulate a request by a browser for a connection. In these examples, a connection property of a multipurpose internet mail extension (MIME) content-type header field is set as follows: "Content-Type", "application/x-www-form-urlencoded". This content-type header field is used to specify the type and subtype of data in the body of a message as well as to fully specify the encoding of this data. This message is used to open a URL connection to a CGI script program.

Next, the formatted message is sent to the host (step 504). Optionally, the "path info" or "query string" can be used for tacking on data to the end of the URL string. Some servers, however, limit the size of URL string to 255 bytes. As a result of this size limitation, only a small amount of data can be sent in this manner. Also, if a connection cannot be successfully established, it is not possible for the client to know if the data made it to the server. The applet then waits for a connection to be established (step 506). The mechanism for waiting to see if a connection is established is described in more detail in section 708 of code 700 in FIGS. 7A–7D below.

After the connection is established, data transfer from the applet to host occurs (step 508). Next, data is received, a line at a time from the server. A determination is made as to whether another line of data is present for receipt from the server (step 510). When all the data from the host is received by the applet, the applet closes its input stream (step 512). For example, the applet may create an output stream and send the data to the CGI script using this output stream. The output stream is closed after data has been written to the output stream. This method is similar to data that is posted to a server when an HTML FORM is submitted at a website. Additionally, the data transfer may include receiving data, which involves creating an input stream, receiving the data from the CGI script using the input stream, and closing the input stream after all the data has been read from the host by the applet.

Thereafter, a status message for the user is generated and displayed (step 514) with the process terminating thereafter. In this example, the message is used to confirm the success or failure of the data transfer. The success or failure may be identified through predefined return codes established with the CGI script during the data transfer.

With reference again to step 510, if additional data is present for receipt from the server, the line of data is received and saved in a program variable (step 516) with the process then returning to step 510 as described above.

Figure 6:
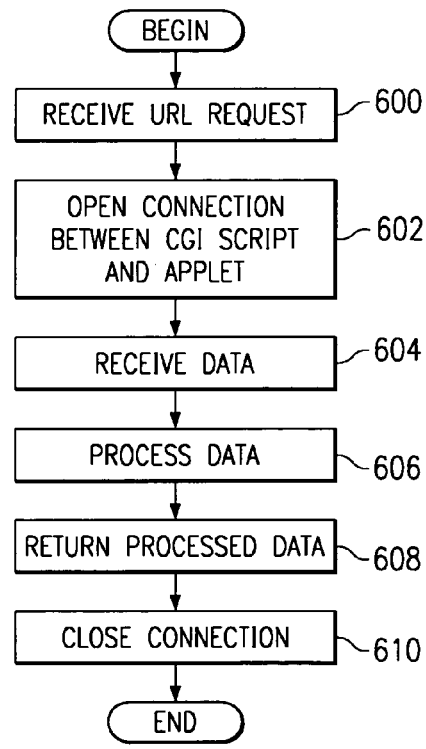
FIG. 6 is a flowchart of a process used for handling a data transfer at a host in accordance with a preferred embodiment of the present invention.

With reference now to FIG. 6, a flowchart of a process used for handling a data transfer at a host is depicted in accordance with a preferred embodiment of the present invention. The process illustrated in FIG. 6 may be implemented in a program, such as CGI script 410 in FIG. 4.

The process begins by receiving a URL request (step 600). Thereafter, a connection is opened between the CGI script and the applet on the client (step 602). Data is received from the applet (step 604). The received data is then processed (step 606), which may involve storing or retrieving data from a backend database, and the processed data is returned to the applet (step 608). Thereafter, the connection is closed (step 610) with the process terminating thereafter. This data transfer may take place, for example, using an output stream and/or an input stream as described above. The client, in this case the applet, always initiates and opens a connection to a server. The connection is closed when the CGI script sends the request back to the client and then terminates its' execution process on the host.

Turning next to FIGS. 7A–7D, a diagram illustrating code segments in an applet for simulating a browser is depicted in accordance with a preferred embodiment of the present invention. Code 700 provides a function executed by an applet to allow the applet to make a connection with a host and then exchange data with the host. This host is the host from which the applet is downloaded. In these examples, the code is written in Java. Code 700 receives the name of a servlet or CGI script at the server. This program is used by the applet to handle adding, deleting, updating, and retrieving data from a database accessible by the host. Another input used by code 700 is a data stream, which will be sent to the host after the connection is created. Section 702 shows how the function stdioTalkToHome( ) is invoked, receiving input parameters such as the name of the CGI program at the host and the data stream to be sent to the host. Section 704 is used to find the host and port from which the applet was launched. Section 706 is used in creating a URL string. Next, in section 708, a URL connection to the host is created. Data is sent from the applet to the host using section 710. Section 712 is used in receiving data from the host in these examples. Cleanup occurs in section 714. Also, a helper function called consoleDebug( ), is shown at the bottom of this section.

Thus, the present invention provides an improved method, apparatus, and computer implemented instructions for transferring data between an applet and a host from which the applet is downloaded. The applet simulates a browser in establishing a connection and transferring data with the host. In the depicted examples, an applet prepares an HTTP encoded stream similar to the one a browser sends. Since in these examples a browser is able to communicate through a firewall, the URL encoded stream also passes through the firewall. At the originating host, a CGI script catches and processes the HTTP stream from the applet. This mechanism is especially useful with unsigned applets, and users avoid the fear of receiving signed applets, which might harm their client system. Further, the mechanism of the present invention avoids requiring a user to modify the client for data transfers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples illustrate the use of a CGI script program, other types of programs may be used, such as a servlet. Further, the applets are illustrated as Java applets. This mechanism also may be applied to other types of programs and programming languages. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for communicating across a firewall with a host, the method comprising:
   simulating a browser in the data processing system to form a simulation, wherein the browser being simulated is able to communicate through the firewall, and wherein simulating the browser includes preparing an encoded data stream similar to one that is sent by an actual browser; and
   communicating with the host directly using the simulation instead of using the browser, wherein the step of communicating with the host includes sending a message in which a header field is set to specify the type of data in the body of the message.

2. The method of claim 1, wherein the simulating and communicating steps are performed by an applet.

3. The method of claim 1, wherein the applet is a Java applet.

4. The method of claim 1, wherein the communication step is performed using hypertext transfer protocol data streams.

5. The method of claim 1, wherein the simulating step includes creating an universal resource locator connection with the host.

6. The method of claim 1, wherein the header field is a multipurpose internet mail extension content-type header field.

7. The method of claim 1, wherein the message is used to open a universal resource locator connection to a program on the server.

8. The method of claim 1, wherein the step of communicating includes sending a message with a universal resource locator identifying a program to receive the data.

9. A data processing system comprising:
   a bus system;
   a communications unit connected to the bus, wherein data is sent and received using the communications unit;
   a memory connected to the bus system, wherein a set of instructions are located in the memory; and
   a processor unit connected to the bus system, wherein the processor unit executes the set of instructions to simulate a browser in the data processing system in which the browser being simulated is able to communicate through the fire wall and communicate with the host directly instead of using the browser, wherein the step of communicating with the host includes sending a message in which a header field is set to specify the type of data in the body of the message.

10. The data processing system of claim 1, wherein the bus system includes a primary bus and a secondary bus.

11. The data processing system of claim 1, wherein the processor unit includes a single processor.

12. The data processing system of claim 1, wherein the processor unit includes a plurality of processors.

13. The data processing system claim 1, wherein the communications unit is an Ethernet adapter.

14. A data processing system for communicating across a firewall with a host, the data processing system comprising:
   simulating means for simulating a browser in the data processing system to form a simulation, wherein the browser being simulated is able to communicate through the firewall, and wherein simulating the browser includes preparing an encoded data stream similar to one that is sent by an actual browser; and communicating means for communicating with the host directly using the simulation instead of using the browser, wherein the means of communicating with the host includes sending a message in which a header field is set to specify the type of data in the body of the message.

15. The data processing system of claim 14, wherein the simulating and communicating means are located in an applet.

16. The data processing system of claim 14, wherein the applet is a Java applet.

17. The data processing system of claim 14, wherein the communication means uses hypertext transfer protocol data streams.

18. The data processing system of claim 14, wherein the simulating step includes creating an universal resource locator connection with the host.

19. The data processing system of claim 14, wherein the header field is a multipurpose internet mail extension content-type header field.

20. The data processing system of claim 14, wherein the message is used to open a universal resource locator connection to a program on the server.

21. The data processing system of claim 14, wherein the means of communicating includes sending a message with a universal resource locator identifying a program to receive the data.

22. A computer program product in a computer readable medium for use in a data processing system for communicating across a firewall with a host, the computer program product comprising:

first instructions for simulating a browser in the data processing system to form a simulation, wherein the browser being simulated is able to communicate through the firewall, and wherein simulating the browser includes preparing an encoded data stream similar to one that is sent by an actual browser; and second instructions for communicating with the host directly using the simulation instead of using the browser, wherein the instructions for communicating with the host includes sending a message in which a header field is set to specify the type of data in the body of the message.

* * * * *

UNITED STATES PATENT AND TRADEMARK OFFICE
CERTIFICATE OF CORRECTION

PATENT NO.       : 6,968,356 B1
APPLICATION NO.  : 09/692394
DATED            : November 22, 2005
INVENTOR(S)      : Lakhdhir Page 1 of 1

It is certified that error appears in the above-identified patent and that said Letters Patent is hereby corrected as shown below:

(12) delete "Lakhdir" and insert --Lakhdhir--.

(75) Inventor: "Mansoor Abdulali Lakhdir" and insert --Mansoor Abdulali Lakhdhir--.

Col. 8, line 15: before "below" delete "7A-7D" and insert --7A-7H--.

Col. 8, line 61: after "next to" delete "FIGS. 7A-7D" and insert --FIGS. 7A-7H--.

Col. 10, line 51: after "claim" delete "1" and insert --9--.

Col. 10, line 53: after "claim" delete "1" and insert --9--.

Col. 10, line 55: after "claim" delete "1" and insert --9--.

Col. 10, line 57: after "claim" delete "1" and insert --9--.

Signed and Sealed this

Twelfth Day of September, 2006

JON W. DUDAS
*Director of the United States Patent and Trademark Office*